United States Patent [19]

Quist

[11] Patent Number: 4,467,504

[45] Date of Patent: Aug. 28, 1984

[54] FASTENER KIT FOR SHEET MATERIALS

[75] Inventor: Robert Quist, Grimsby, Canada

[73] Assignee: Westbrook Greenhouses Limited, Grimsby, Canada

[21] Appl. No.: 324,730

[22] Filed: Nov. 25, 1981

[51] Int. Cl.³ .............................................. A44B 21/00
[52] U.S. Cl. ...................................... 24/462; 24/72.5; 160/395
[58] Field of Search ................ 24/72.5, 243 K, 134 R, 24/201 C, 259 RC; 160/327, 328, 392, 395; 135/15 C F

[56] References Cited

U.S. PATENT DOCUMENTS

| | | | |
|---|---|---|---|
| 3,803,671 | 4/1974 | Stuppy et al. | 24/243 K |
| 4,103,401 | 8/1978 | Conley | 24/243 K |
| 4,107,826 | 8/1978 | Tysdal | 24/243 K |
| 4,153,981 | 5/1979 | Stuppy | 24/243 K |
| 4,267,876 | 5/1981 | Bloomfield | 160/395 |
| 4,341,255 | 7/1982 | Mock | 24/243 K |

Primary Examiner—Robert P. Swiatek
Assistant Examiner—John Weiss
Attorney, Agent, or Firm—Rogers, Bereskin & Parr

[57] ABSTRACT

A fastener kit for securing flexible sheet materials such as polyethelene film to a structure to provide greenhouse coverings, wind screens and the like. The kit comprises an elongate channel member securable to the structure as with screws, an elongate lock member which can be forced into the channel member with sheet materials secured therebetween, and an elongate clip member which can be used to secure second material between the clip and lock members. The clip member is formed of a rigid material which can be flexed to place two longitudinal gripping portions of the clip member into gripping engagement with corresponding surface portions of the lock and channel members, or flexed to remove the clip member. The arrangement permits the second sheet material to be secured to or removed from the structure without requiring total disassembly of the kit members and removal of the first sheet material.

7 Claims, 6 Drawing Figures

FASTENER KIT FOR SHEET MATERIALS

The invention relates to a fastener kit for use in securing sheet materials to a structure.

Fastener kits of this type are known, and have been used to erect temporary structures such as greenhouse coverings, partitions and wind screens from materials such as polyethelene films. These kits generally comprise an elongate channel member which can be cut to a suitable length and then secured to a structure, and an elongate lock member which can be pressed into interlocking engagement with the channel member, with a peripheral portion of a sheet material secured between the channel and lock members. A typical prior art kit is illustrated in U.S. Pat. No. 4,153,981 which issued on May 15, 1979 citing Frances X. Stuppy as inventor.

A problem associated with the prior art kits is that they do not readily permit the addition or removal of extra sheets of material once a structure has been erected. In greenhouse applications, for instance, it may be desirable to add sheets of opaque material to reduce transmission of sunlight during the summer, and to remove these sheets during seasons when the intensity of sunlight is considerably lessened. When weather becomes cold, it may be desirable to add an additional sheet (or several sheets) to better insulate a greenhouse. With prior art kits the addition or removal of such opaque or additional sheets often necessitates total disassembly of kit members, and the removal and reinstallation of sheet materials already in use.

Accordingly, the invention provides a fastener kit comprising an elongate channel member securable to a preexisting structure and an elongate lock member which can be aligned with the channel member and then forced into interlocking engagement with the channel member, with a first sheet material secured therebetween. The kit also comprises an elongate clip member having two longitudinal gripping portions separated by a rigid, elastically flexible body portion. The body portion can be flexed to place the gripping portions into engagement with appropriately shaped surface portions of the lock and channel members, with a portion of a second sheet material secured between the clip member and one of the channel and lock members. The clip member is preferrably formed with a longitudinal groove for receiving a bladed tool by means of which the clip member can be flexed to secure the clip member to the channel and lock members, or to remove the clip member. Thus, with a fastener kit constructed according to the invention, the second sheet material can be added or removed from the structure to which the kit members are secured, without requiring disassembly of the lock and channel members and without disturbance of the first sheet material.

Other advantages of the invention will be apparent from a description below of a preferred embodiment of a fastener kit, taken together with the drawings in which.

Figure 1:
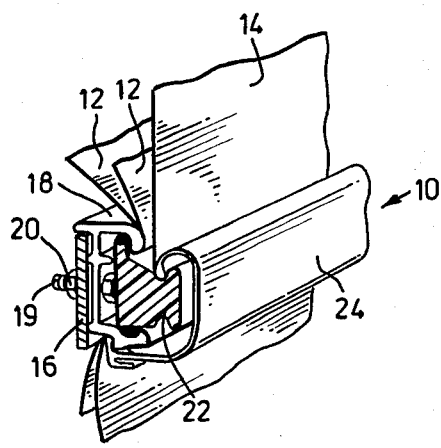
FIG. 1 is a partially fragmented, perspective view illustrated kit members assembled and fastened to a steel beam, and functioning to secure plastic sheet materials to the beam.
Figure 2:
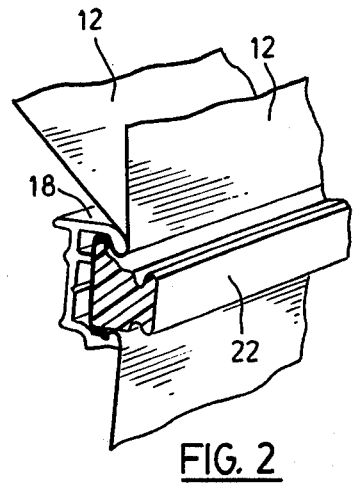
FIG. 2 is a partially fragmented perspective view better illustrating interlocked channel and lock members of the kit.
Figure 3:
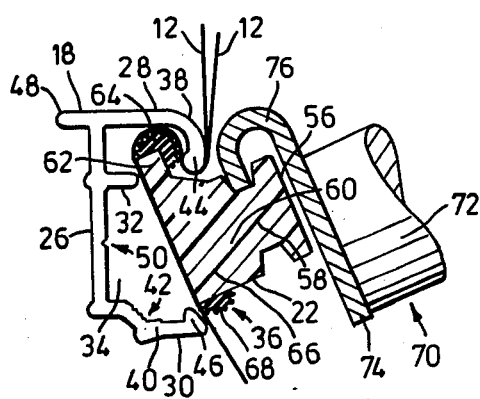
FIGS. 3-4 illustrate the insertion of a lock member into a channel member of the kit to retain a first sheet material; and, FIGS. 5-6 illustrate the location of the clip member on the lock and channel members to secure additional sheet material.
Figure 4:
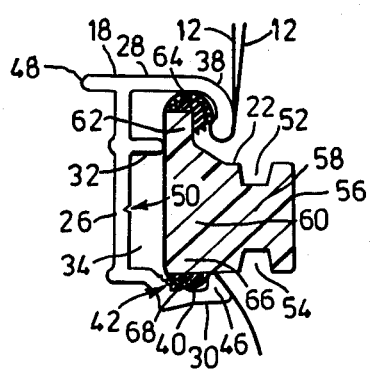
Figure 5:
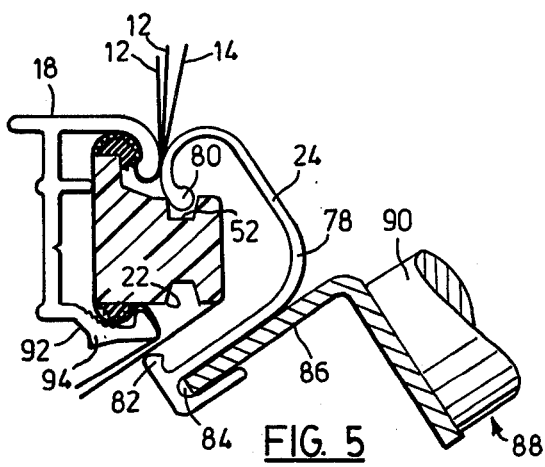
Figure 6:
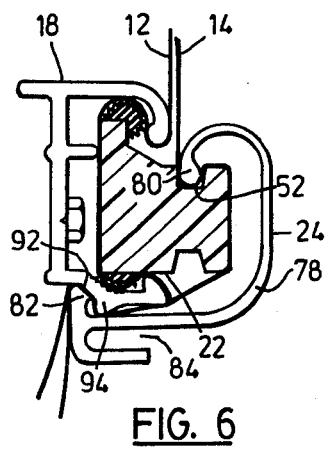

Reference is made to FIG. 1 which illustrates a fastener kit 10 (a preferred embodiment of the invention) used to secure twin sheets 12 and an additional sheet, 14 of polyethelene film, to a steel beam 16. The kit 10 comprises an elongate channel member 18 secured by bolts 19 and nuts 20 (only one pair illustrated) to the beam 16, an elongate lock member 22 interlocked with the channel member 18, and an elongate clip member 24 fastened between the channel and lock members 18, 22. It is apparent from FIGS. 1-2 that the lock member 22 secures the sheets 12 to the channel member 18, and that the clip member 24 secures the sheet 14 between itself and the channel and lock members 18, 22. As mentioned above, the sheets 12 might be transparent sheets, and the sheet 14 an opaque sheet intended for temporary use and periodic attachment and removal.

The channel member 18 is constructed of aluminum, and has the generally E-shaped transverse cross-section illustrated in the plane of the views of FIGS. 2-6. The channel member 18 is formed with an upright spine 26, an upper arm 28, a lower arm 30, and a spacing rib 32, these elements defining a longitudinal channel 34 and a mouth 36 accessing the channel 34. The upper arm 28 has an arcuate portion 38 which defines a seat for receiving a portion of the lock member 22. The lower arm 30 has an arm portion 40 which defines another seat, formed with a plurality of longitudinal gripping ridges 42, for receiving another portion of the lock member 22. The arms 28, 30 terminate respectively in longitudinal retaining beads 44, 46 which in use ensure positive retention of the lock member 22. The channel member 18 is also formed with an overhanging lip 48 which extends perpendicularly from the spine 26 to serve as a guide for aligning the channel member 18 along an edge of a steel beam (as in FIG. 1). A V-shaped longitudinal notch 50 is formed in the spine 26 to facilitate the proper location of clearance holes for bolts 19.

The lock member 22 is extruded from polyvinylchloride (PVC) materials, and has the generally uniform transverse cross-section illustrated in FIGS. 3-6. Two longitudinal grooves 52, 54 define in the lock member 22 a head 56, a neck 58 and a body 60. A longitudinal foot 62 extends from the body 60 and has bonded thereto a longitudinal cushion 64 of a very soft, deformable PVC material. An oppositely-disposed body portion 66 is similarly extruded with a longitudinal cushion 68 of the PVC material. Each of the cushions 64, 68 is formed with longitudinal ridges so that the cushion 64, 68 can better grip plastic sheet materials when the lock member 22 is interlocked with the channel member 18.

The lock member 22 is inserted in the channel member using a tool 70 having a cylindrical lever arm 72 and a blade 74 turned back on itself to define a U-shaped blade portion 76. The polyethelene sheets 12 are placed over the mouth 36 of the channel member 18, and the foot 62 of the lock member 22 is then inserted into the channel 34 until located against the seat 38 of the upper channel member arm 28. The lock member portion 66 and its cushion 68 will at this point be located against the retaining bead 46, outside the channel 34. The blade 74 of the tool 70 is then placed against the head 56 of the lock member 22 with the U-shaped blade portion 76 engaging the groove 52. Now the lock member 22 can be rotated (clockwise in the view of FIG. 3) by means of the lever arm 72 to force the lock member 22 into the channel 34, the foot 62 serving as a fulcrum for such levering and rotation. The spacing rib 32 ensures that the lock member is properly placed towards the mouth 36 of channel member 18.

To remove the lock member 22 from the channel member 18 the blade 74 of the tool 70 is abutted against the head 56 of the lock member 18 with the U-shaped blade portion 76 disposed in the groove 54 (instead of the groove 52). The lock member 22 is then rotated counter-clockwise from the position of FIG. 4 using the lever arm 72 of the tool 70, the foot 62 once again serving as a fulcrum for rotation and levering, until freed.

In the prior art kits, sheet material retained between channel and lock members have been damaged when squeezed between metal surfaces. This problem is overcome by providing the lock member 22 with longitudinal cushions 64, 68, located where the lock member 22 is gripped by the arms 28, 30 of the channel member 18. The longitudinal ridges formed in the surfaces of the cushions 64, 68 ensure a more positive gripping action in this arrangement.

Another problem associated with prior art channel and lock members of rigid metal construction (typically aluminum) has been a tendency for the lock member to deform permanently when pried in a piece-wise fashion from the channel member. This problem is overcome in the channel and lock members 18, 22 by forming the lock member 22 of a PVC material so that the lock member 22, although sufficiently rigid to interlock positively in the channel member 18, can still deform elastically when removed. The aluminum channel member 18 thus provides the assembled channel and lock member combination with a degree of rigidity and strength necessary for proper securement to a beam etc., while the relatively flexible lock member 22 ensures that the combination can be easily disassembled, without the permanent deformation characteristic of prior art fastener kits.

The clip member 24 (shown in transverse cross-section in the views of FIGS. 5–6) is constructed of aluminum, and has an arcuate, generally C-shaped body portion 78 terminating at one side in a curled, longitudinal gripping finger 80, and at another side in a longitudinal gripping finger 82. A longitudinal groove 84 defined adjacent to the finger 82, serves to receive the blade 86 of a tool 88, used to attach and remove the clip member 24 from the channel and lock members 18, 22.

In use, the sheet 14 is placed over the head 56 of the lock member 22, and the clip member finger 80 is inserted into the lock member groove 52. The blade 86 of the tool 88 is then inserted into the groove, and the clip member 24 is then rotated and flexed by means of the tool lever arm 90 to engage the gripping finger 82 against the lower channel member arm 30. A sloped portion 92 and shoulder 94 on the lower arm 30 together with the gripping finger 82 form a detent to retain the clip member 24. To this end an upper portion of the finger 82 is angled for substantially conforming engagement against the sloped portion 92, and the elasticity and arcuate shape of the clip member 24 are such that the gripping finger 82 tends to loosely grip the sloped portion 92 and to abut the shoulder 94 when an effort is made to remove the clip member 24 (until sufficient prying force is applied with the tool 88 to once again flex the clip member 24.)

The clip member 24 is dimensioned to loosely grip the channel and lock member 18, 22. Consequently, a certain amount of clearance is provided between the gripping fingers 80, 82 and the channel and lock members 18, 22, to be taken up by the sheet 14. A tighter grip can be provided if desired, but the tendency to damage the sheet 14, especially if the sheet 14 is to be removed periodically, will increase.

A preferred embodiment of a fastener kit has been described above, and it will be appreciated that modifications of a workshop nature can be made to the kit described without departing from the spirit and scope of the invention.

I claim:

1. A fastener kit for securing flexible sheet material to a structure, comprising:
   an elongate channel member securable to the structure and having a longitudinal channel accessed by a longitudinal mouth;
   an elongate lock member shaped to be longitudinally aligned with the mouth of the channel member with a portion of a first sheet material disposed between the channel and lock members, and then to be forced into the channel in releasably interlocking engagement with the channel member whereby the portion of the first sheet material is secured between the channel and lock members; and,
   an elongate clip member having first and second longitudinal gripping portions and a body portion extending between the first and second gripping portions, the clip member being formed of a rigid material sufficiently elastic and so shaped that the body member can be elastically flexed to place the first and second gripping portions into gripping engagement respectively with the lock and channel members with a portion of a second sheet material secured between the clip, channel and lock members, the clip member thereafter remaining secured to the channel and lock members until the body portion is once again elastically flexed to release the gripping portions from the channel and lock members.

2. A fastener kit as claimed in claim 1, in which:
   the lock member comprises a longitudinal groove for receiving the first gripping portion;
   the first gripping portion comprises a first longitudinal finger insertable into the groove in the lock member; and,
   the body portion of the clip member is shaped so that the clip member can be rotated relative to the groove in the lock member, when the first finger is disposed in the groove, to place the second gripping portion into engagement with a longitudinal portion of the channel member, the second gripping portion and the longitudinal channel member portion defining a detent for thereafter releasably securing the clip member to the channel and lock members.

3. A fastener kit as claimed in claim 2 in which the second gripping portion comprises a second longitudinal finger and the longitudinal channel portion defines a longitudinal shoulder positioned to be engaged by the second finger to form the detent.

4. A fastener kit as claimed in claim 2 or 3 in which the clip member is formed with a longitudinal tool receiving groove so positioned that a bladed tool can be located in the tool receiving groove to flex the body portion when the first finger is located in the groove in the lock member to cause the second gripping portion to engage the longitudinal channel member portion.

5. A fastener kit as claimed in claim 1 in which the lock member comprises:
   a longitudinal foot insertable into the channel of the channel member and serving as a fulcrum about which the lock member can be rotated to force the lock member into and out of the channel; and,
   first and second longitudinal grooves disposed in substantially parallel relationship on opposing sides of the lock member to define a longitudinal head portion on the lock member;
   whereby, a tool having a handle secured to a blade with a V-shaped peripheral blade portion can be used to rotate the lock member into and out of the channel, the lock member being interlocked with the channel member by locating the blade of the tool against the head portion of the lock member with the U-shaped blade portion arching into the first groove and thereafter rotating the lock member in a first angular direction by means of the handle relative to the lock member foot inserted in the channel, and the lock member being removed from the channel by locating the blade of the tool against the head portion of the lock member with the U-shaped blade portion arching into the second groove and thereafter rotating the lock member in a second angular direction opposite to the first angular direction relative to the lock member foot.

6. A fastener kit as claimed in claim 5 in which only the foot and an oppositely-disposed portion of the lock member are frictionally engaged by channel member when the lock member is interlocked with the channel member, and the foot and the oppositely-disposed lock member portion are formed with soft surface portions for engagement against the sheet material.

7. A fastener kit as claimed in claim 5 in which the channel member is a rigid member formed of a metal and the lock member is formed of a relatively flexible plastic material.

* * * * *